United States Patent

[11] 3,614,608

| [72] | Inventors | Gary R. Giedd<br>Wappingers Falls;<br>Gerald A. Maley, Fishkill; Merlyn H.<br>Perkins, Hopewell Junction, all of N.Y. |
|---|---|---|
| [21] | Appl. No. | 825,870 |
| [22] | Filed | May 19, 1969 |
| [45] | Patented | Oct. 19, 1971 |
| [73] | Assignee | International Business Machines Corporation<br>Armonk, N.Y. |

[54] RANDOM NUMBER STATISTICAL LOGIC TEST SYSTEM
9 Claims, 6 Drawing Figs.

[52] U.S. Cl. .................................................. 324/73 R
[51] Int. Cl. ..................................................... G01r 15/12
[50] Field of Search .......................................... 324/73, 158; 179/175.2; 235/151.5; 371/78

[56] References Cited
UNITED STATES PATENTS

| 3,182,253 | 5/1965 | Dorsch | 324/51 |
| 3,302,109 | 1/1967 | Jones | 324/73 |
| 3,311,890 | 3/1967 | Waaben | 340/172.5 |
| 3,286,175 | 11/1966 | Gerbier | 324/73 |

*Primary Examiner*—Michael J. Lynch
*Attorneys*—Hanifin and Jancin and Theodore E. Galanthay ABSTRACT: A system for testing complex circuitry primarily in large scale integration, where a great number of inputs and outputs must be tested and the internal circuitry is inaccessible. The test system has a random number generator which simultaneously applies a plurality of signals in a random pattern to the plurality of input pins of both the test circuit and a reference circuit. Compare circuitry is responsive to signals received from the test and reference circuits and provides an error signal when the two outputs are not matched.

INVENTORS
GARY ROBERT GIEDD
GERALD ADRIAN MALEY
MERLYN HAROLD PERKINS

BY Theodore E. Galanthay
AGENT

RANDOM NUMBER STATISTICAL LOGIC TEST SYSTEM

CROSS REFERENCE TO RELATED APPLICATION OR PATENT

Serial No. 36,523, filed May 12, 1970, Inventors: Heilweil et al. and assigned to the assignee of the present application.

BACKGROUND OF THE INVENTION

1. Field of the Invention

Our invention relates to a logic test system and more specifically to a system for testing highly complex functional logic circuitry of the type encountered in large scale integration.

2. Description of the Prior Art

The prior art concerns itself with testing various electronic devices by comparing the response of a known good reference device with that of a device under test. Test systems presently known in the art, however, are incapable of testing highly complex functional logic circuitry. For example, to test such a circuit with conventional techniques, a circuit having 100 inputs would require $10^{15}$ years if a new input combination was presented at a 100 megacycle rate. Therefore, the prior art techniques which apply a test pattern having every possible input combination are no longer practical.

A further characteristic of the circuitry to be tested is that the projected yield rates are relatively low resulting in a very high reject rate during testing. Furthermore, the large number of individual circuit part numbers precludes specialized test systems tailor made to each individual circuit part number. Cost considerations even preclude the use of a test system with a large number of individual sophisticated programs for each part number. Considerations of cost and time prohibit detailed optical examination of each logic circuit. Furthermore, for purposes of speed and efficiency it is desirable to test components on a real-time basis. Presently known testers are incapable of testing complex functional logic circuitry of this type.

SUMMARY OF THE INVENTION 13

Accordingly, it is an object of our invention to test complex functional logic circuitry.

It is another object of our invention to provide a low cost tester operable with simple programs and particularly adapted for testing integrated circuitry.

A still further object of our invention is to test complex functional logic circuitry with a random test pattern on a statistical and real-time basis.

A specific object of our invention is to test integrated circuitry having both combinatorial and sequential logic circuits.

In accordance with our invention, a random number generator applies an identical test pattern of random numbers to both the logic under test and the reference logic. It is immaterial whether the test pattern used is a true random pattern or a pseudo-random pattern. The pseudo-random pattern has the advantage that it is predictable and therefore provides an equal distribution of numbers during any given test cycle. The number of patterns available from a pseudo-random generator is given by the formula $2^{n+1}$. Therefore, a 44-output random number generator provides over 1.7 times $10^{13}$ combinations. However, it has been found that a small portion of these combinations will cause each input and output in a test circuit to switch hundreds of times without a single test pattern being repeated. The reference logic is an equivalent of the logic under test and can be either a logic simulator or a good logic unit of the type of test. In this way, each under the corresponding input and output pins of the logic under test and reference logic receive identical signals from the random number generator.

In order to have the flexibility of testing both combinatorial and sequential logic circuits, the strobe register is provided so that the signal on only one pin in each of logic under test and the reference logic is changed at a time. But the signals on all the pins are compared during every test cycle, providing a real-time rate of testing. The logic compare unit compares the response of the logic under test and the reference logic and provides an output in the event that a connecting pin of the logic under test provides a signal difference from a corresponding pin in the reference logic. It is also possible to test only corresponding output pins.

The test system of our invention tests circuit packages which include 50 or more circuits with a corresponding large number of input-output (I/O) connecting pins. Most of the circuitry is inaccessible for conventional testing techniques. Our test system quickly and efficiently reveals at least 90 percent of the failing part numbers. Only the remaining components must then be subjected to time consuming optical testing, thereby resulting in a great saving of time. Most errors are detected in brief intervals of time; however, increasing the length of time that the test pattern is applied increases the reliability of the test.

The foregoing and other objects, features and advantages of our invention will be apparent from the following and more particular description of preferred embodiments as illustrated in the accompanying drawings.

GENERAL DESCRIPTION

Figure 1:
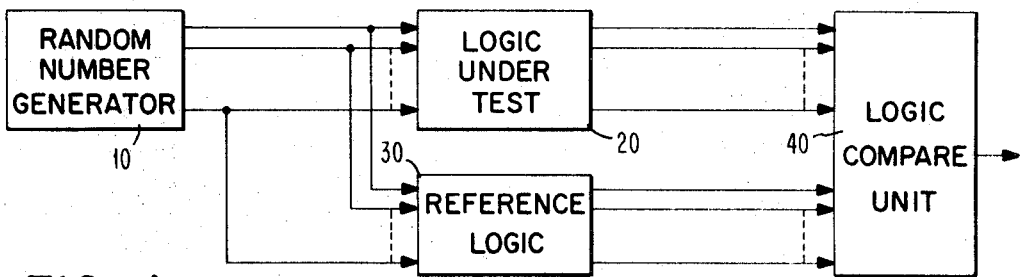
FIG. 1 is a generalized block diagram of a preferred embodiment of our invention.

Refer now to FIG. 1 for a basic block diagram in accordance with our invention. Logic under test 20 and reference logic 30 are both connected to random number generator 10. Logic under test 20 and reference logic 30 are also connected to the logic compare unit 40. Random number generator 10 provides outputs to corresponding pins of the logic under test 20 and the reference logic 30. The test pattern can be either pseudo-random or truly random as described in greater detail later. The test pattern is applied to the input pins of logic 20 and 30; the output pins being connected to logic compare unit 40. Normally, only the outputs of reference logic 30 need be compared to the outputs of logic under test 20. It is also possible, however, to sense the respective input pins in logic under test 20, thereby detecting impedance mismatches, particularly open and short circuits. When the response of logic under test 20 and reference logic 30 is not identical, logic compare unit 40 provides an error output.

Figure 2:
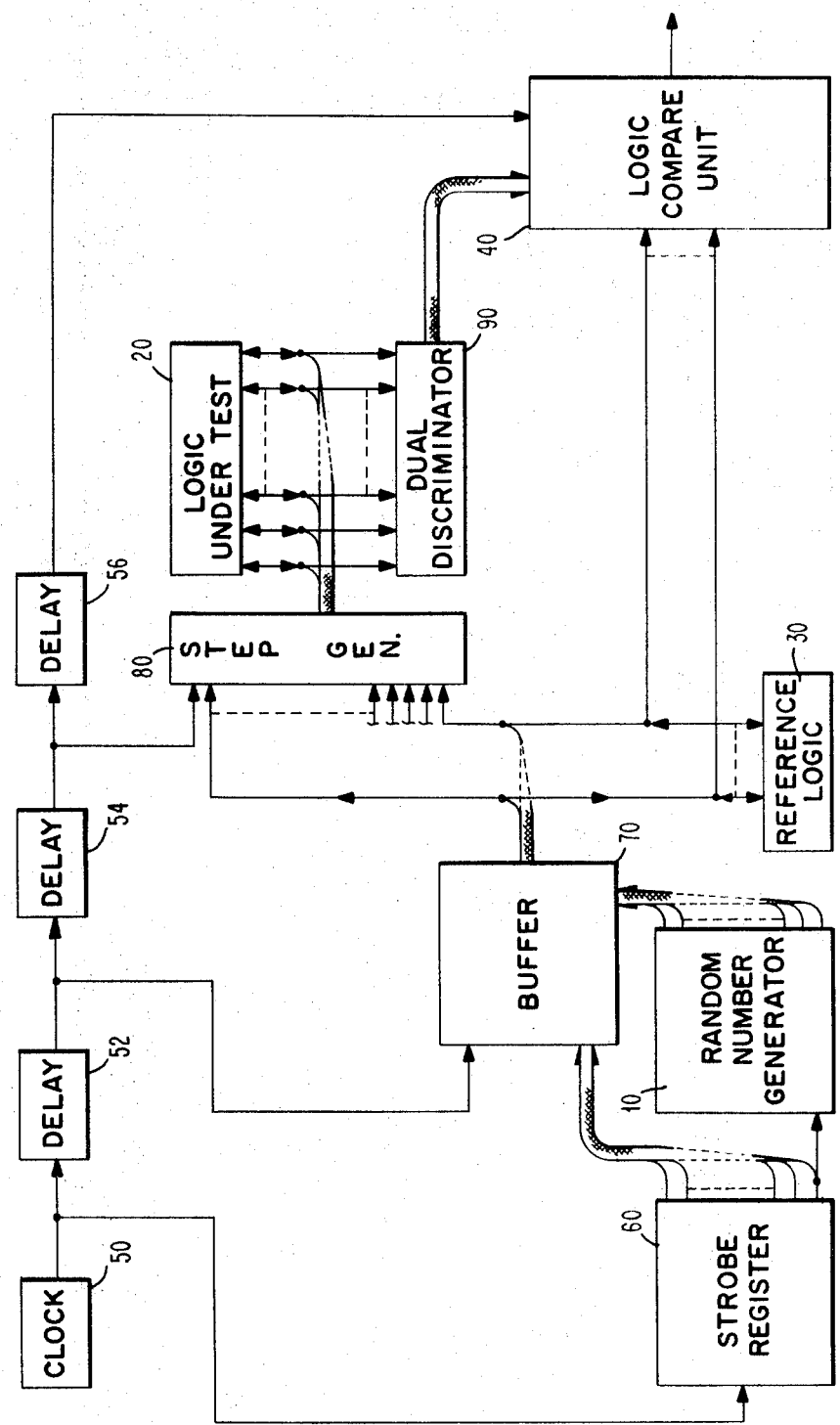
FIG. 2 is a more detailed block diagram of our invention.

Refer now to FIG. 2 for a more detailed block diagram of our invention. Clock 50 is a pulse generator of standard construction and provides timing pulses to the system directly to strobe register 60 and also through appropriate delay circuits 52, 54, and 56. The output of strobe register 60 is connected to random number generator 10 and buffer 70. It is the purpose of strobe register 60, random number generator 10 and buffer 70 to provide an appropriate random test pattern. Assuming for purposes of example that a circuit to be tested has 48 connecting pins, then random number generator 10 will have an equal number i.e. 48 outputs. In the same example, which will be used throughout this specification, strobe register 60 has 49 outputs, one of these outputs applying a signal to random number generator 10; the other 48 outputs being connected to buffer 70.

Buffer 70 receives 48 inputs from strobe register 60, 48 inputs from random number generator 10 and a timing signal from delay circuit 52. As an output, buffer 70 provides the same number of outputs, i.e. 48, to step generator 80 and reference logic 30. Buffer 70 includes switching means, as will be described in greater detail, whereby the input pins are distinguished from the output pins to be tested. More specifically, the test pattern is gated through to corresponding input pins, while corresponding output pins receive steady state "up" or "down" signals. For purposes of illustration, "up" signals will be referred to as "1's" and "down" signals will be referred to as "0's."

Step generator 80 accepts the 48 signals from buffer 70 and in response to a timing pulse from delay circuit 54, simultaneously supplies these 48 input signals to logic under test 20. Step generator 80 provides timing and pulse shaping, particularly for supplying fast rise-time pulses at proper voltage levels of logic under test 20.

The input and output pins of logic under test 20 are connected to dual discriminator 90 which determines the voltage levels of said pins in response to the signals from generator 80. Of course if it is desired to check only outputs, only the output pins of reference logic 30 are connected to logic compare unit 40. Dual discriminator 90 then provides binary signals to logic unit 40 for comparison with corresponding binary signals from reference logic 30. In the event that only output pins are to be compared, it would still be possible to perform a separate test of the input pins, which would merely be a check for voltage levels to determine possible open and short circuits.

Logic compare unit 40 receives inputs from dual discriminator 90, reference logic 30, and compares corresponding signals. When a mismatch occurs, an error signal is provided in response to a timing pulse from delay circuit 56. Such an error signal can be connected to stop the output of clock 50, thereby stopping the test. Delay circuit 56 is a relatively long delay so that the signals from both reference logic 30 and dual discriminator 90 are present at the inputs to logic compare unit 40, before the timing pulse from delay circuit 56 causes a comparison to be made.

DETAILED DESCRIPTION

Figure 3:
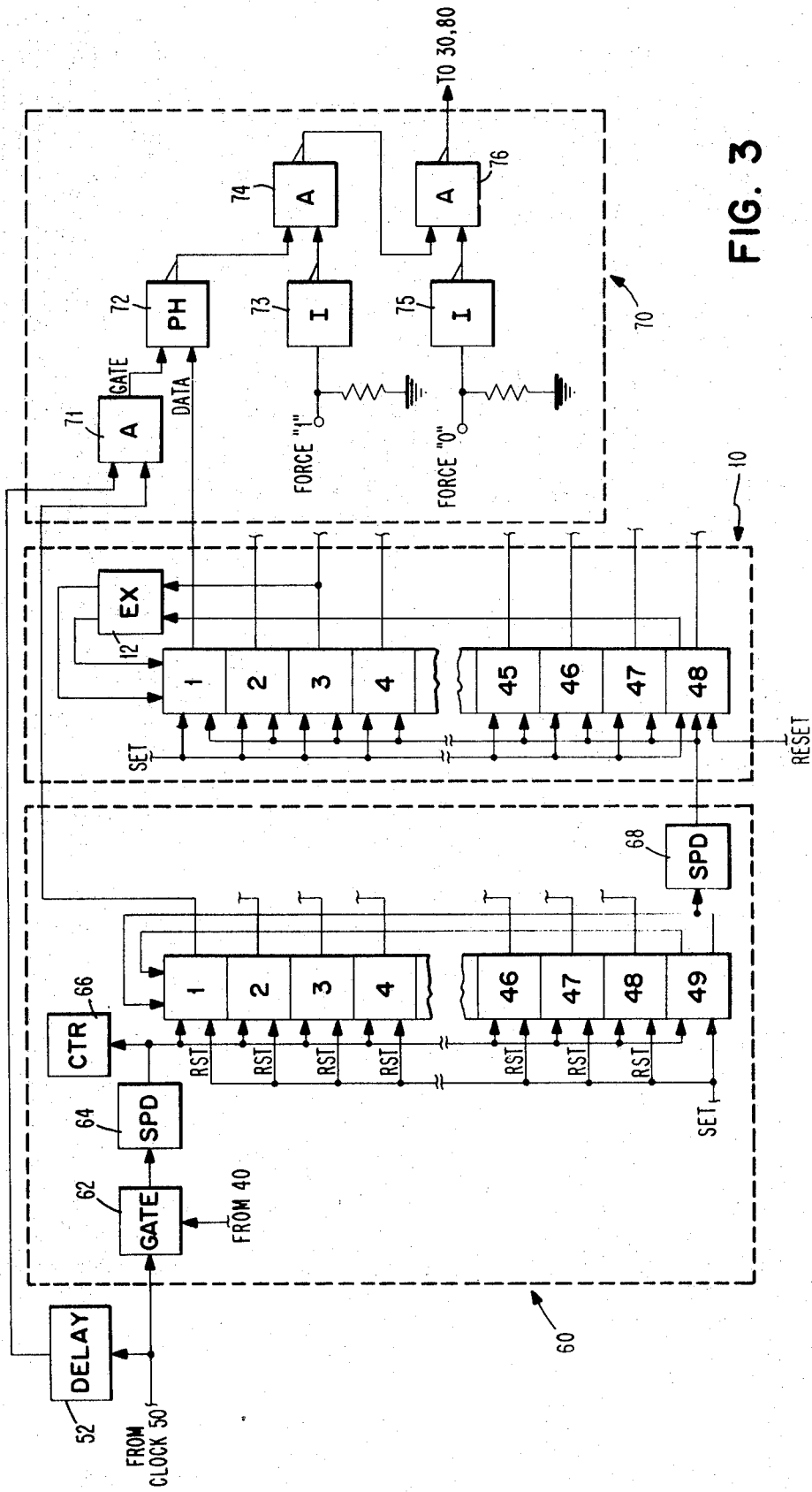
FIG. 3 is a detailed block diagram showing the random number generator, the strobe register, and a portion of the buffer.

For a more detailed description of our invention, refer now to FIG. 3 which is a more detailed block diagram of strobe register 60, random number generator 10 and a portion of buffer 70. Strobe register 60 primarily includes a shift register having 49 stages, one more than the number of pins to be tested. The shift register receives a SET input pulse whereby initial conditions are set such that zeros are inserted into the first 48 stages and a 1 is inserted into the 49th stage. The shift register also receives shift pulses from clock 50 through gate 62 and sample pulse driver 64. The second input to gate 62 is connected to the output of unit compare logic 40. Sample pulse driver 64 merely provides a power drive for the signal from gate 62 so that an input can be provided to all 49 stages of the shift register as well as counter 66. Counter 66 is of conventional construction and provides an indication of the number of tests performed. The 49th stage of the shift register is connected to the first stage so that the "1" initially inserted will be progressively shifted through the register. The 49th stage output is also connected to sample pulse driver 68 which supplies a drive pulse to the random number generator 10. The other 48 outputs of the shift register of strobe register 60 are connected to buffer 70. The second output of the 49th stage is merely an inverted output and is connected to the first stage for conventional operation of the shift register.

With continued reference to FIG. 3, it is seen that random number generator 10 comprises a 48 stage shift register and an exclusive-OR circuit 12. It is possible to set any starting pattern into the shift register through the SET and RESET lines. Each of the 48 stages receives an input from sample pulse driver 68 which provides the shift pulse. Each of the 48 outputs of random number generator 10 is connected to the buffer 70. Random number generator 10 also comprises exclusive-OR circuit 12 which has its inputs connected to the third and 48th stages of the shift register and its outputs (in phase and out of phase) connected to the first stage.

With continued reference to FIG. 3, our invention will be described in still greater detail. In order to facilitate understanding and avoid duplication, the remainder of the system will be described with respect to a single pin to be tested. FIG. 3 therefore shows a portion of buffer 70. The portion of buffer 70 shown is the circuit for the output of the first stage of strobe register 60 and the first stage of random number generator 10. In the system, there are 48 such circuits, each of them identical to the one shown and connected to one of the stages of each of the shift registers as shown for the first stage in FIG. 3.

AS shown in FIG. 3, buffer 70 comprises an AND circuit 71 which receives an input from strobe register 60 and delay circuit 52. Polarity hold (PH) circuit 72 receives the output of AND circuit 71 and random number generator 10. PH circuit 72 comprises a gate and a latch. The output of AND circuit 71 provides the gating signal which enters the polarity of the signal from random number generator 10 into the latch. This resultant output of PH circuit 72 is held until a new signal is gated in by a gating signal from AND circuit 71. The slash mark at the output of PH circuit 72 indicates merely that it is the inverted output which is supplied to AND circuit 74. AND circuit 74 also receives a signal from Invert circuit 73. AND circuit 76 receives inputs from AND circuit 74 and Invert circuit 75. The inverted output of AND circuit 76 is supplied to the pin under test (pin 01 in this example) in reference logic 30. The output of AND circuit 76 is also supplied to step generator 80.

Figure 4:
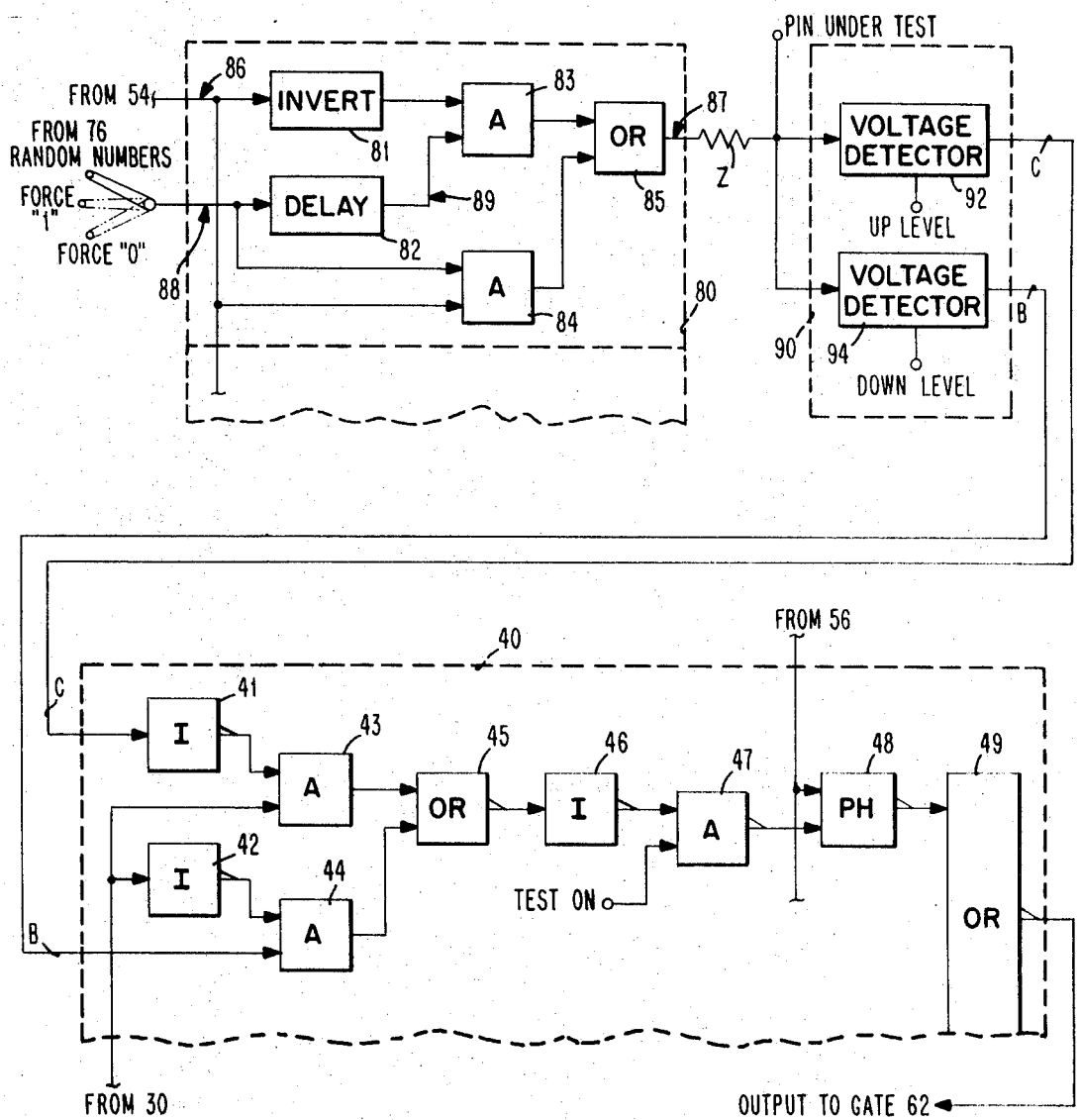
FIG. 4 is a detailed block diagram showing the step generator, the dual discriminator, and the logic compare unit.

Refer now to FIG. 4 which is a detailed block diagram of step generator 80, dual discriminator 90, and unit compare logic 40. Again, the circuitry for only a single pin under test is shown. Therefore, there are 48 identical such circuits in each of step generator 80, dual discriminator 90 and unit compare logic 40.

With continued reference to FIG. 4, step generator 80 comprises Invert circuit 81, delay circuit 82, AND circuits 83 and 84 and OR circuit 85. Invert circuit 81 receives a timing pulse from delay circuit 54, and delay circuit 82 receives data signals from Invert circuit 77 and buffer 70. The output of OR circuit 85 is the properly shaped and timed test signal which is supplied to the pin under test with appropriate impedance matching through the characteristic impedance $Z_0$. The pin under test is one of 48 pins under test in the logic under test 20. In the operation of the invention, it will be described how the input to delay circuit 82 is appropriately switched by buffer 70 depending on whether the pin under test is an input pin or an output pin.

The response from the pin under test is received by dual discriminator 90 which comprises voltage detectors 92 and 94. Voltage detector 92 determines whether the output is above a certain up level, and voltage detector 94 determines whether the output is below a certain down level. If both voltage detector 92 and 94 have an output, an error clearly exists. IF only one of the voltage detectors has an output, then the result must be compared with reference logic 30 to determine whether the response is correct.

Unit compare logic 40 receives the two outputs of dual discriminator 90 and an input from reference logic 30. The inputs from dual discriminator 90 are connected to Invert circuit 41 and AND circuit 44. The inputs from reference logic 30 are connected to AND circuit 43 and invert circuit 42. AND circuits 43 and 44 are connected to Invert circuits 41 and 42 respectively. The outputs of AND circuit 43 and 44 are connected to OR circuit 45, the inverted output of which is the input to Invert circuit 46. The output of Invert circuit 46 is connected to the input of AND circuit 47. The second input to AND circuit 47 (Test On) is a gating signal which is brought up to a "1" condition when it is desired to test the pin connected to the circuit. The inverted output of AND circuit 47 is supplied to polarity hold circuit 48. The inverted output of polarity hold circuit 48 is supplied as an input to OR circuit 49. OR circuit 49 also receives 47 other inputs from the other pins being similarly tested. Each of PH circuits 48 supplies an output to OR circuit 49 in response to a timing pulse from delay circuit 56, and this output is held at that polarity (either "0" or "1") until the next timing pulse is received from delay circuit 56. OR circuit 49 provides an inverted output which is the output of unit compare logic 40. This output is connected to gate 62 in order to stop the test when an error is detected.

OPERATION OF THE PREFERRED EMBODIMENT

Having described the structure of our invention in terms of an exemplary embodiment, the operation will now be described. In general, it is the purpose of random number generator 10 to provide a random test pattern to corresponding pins of logic under test 20 and reference logic 30 and to compare the response of these pins in unit compare logic 40 in order to locate faults in the circuitry of logic under test 20.

In this way, a series of random numbers are applied to the inputs of logic 20 and 30 at a real-time rate for a fixed period of time. It is immaterial whether the numbers are presented in a random pattern or a pseudo-random pattern. The pseudo-random pattern actually used for testing is obtained by the interaction of random number generator 10 as well as strobe generator 60 and buffer 70. Refer to FIG. 3 for a description of the beginning of a test cycle. Before testing begins, the 49th register of strobe register 60 has a "1" set therein and the other 48 states are reset to "0." The 48 stages of random generator 10 are set to any desired pattern of "1's" or "0's." After these initial conditions are set, the input to gate 62 is raised to an up level permitting clock pulses to pass through sample pulse driver 64. The first of these clock pulses brings the count in counter 66 to "1." It also shifts the shift register in strobe generator 60 so that the "1" previously in the 49th stage is inserted into the first stage; stages two through 49 containing "O's." At this time random number generator 10 has received no new inputs and therefore maintains the initially inserted pattern. Note that at every 49th clock pulse, the shift register in random number generator 10 is shifted by one in response to a signal through sample pulse driver 68. Note also that whenever the third stage and 48th stage of the shift register in random number generator 10 contain the same number, exclusive-OR circuit 12 inserts a "1" into the first stage. When the third and 48th stages have unlike numbers, exclusive-OR circuit 12 inserts a "0" into the first stage. Thus, for example, if the third and 48th stage contain a "0," then the output of exclusive-OR circuit 12 will insert a "1" into the first stage. The same is true if both the third and 48th stage each contain a one. However, if either the third stage or the 48th stage contains a "0" and the other of the two stages contains a "1" then the output of exclusive-OR circuit 12 is a "0" which is then inserted into the first stage of the shift register.

With continued reference to FIG. 3, it is seen that AND circuit 71 receives a "1" signal from strobe register 60. As soon as the delayed clock pulse arrives at the other input to AND circuit 71 a "1" output is provided to pulse hold circuit 72. Pulse hold circuit 72 will then store whatever number is then located in the first stage of the shift register of strobe register 10. For purposes of example, let us assume that an up level, that is a "1," was present in the first stage in random number generator 10. Pulse hold circuit 72 will then store this "1" and provide a "0" output to AND circuit 74. As was explained previously, the slash at the output of pulse hold circuit 72 indicates than an inverted output is provided.

At this point it is necessary to describe the purpose of Invert circuits 73 and 75. As was previously explained, the circuit shown in FIG. 3 for buffer 70 is only one of 48 identical such circuits. In this example, the the circuit for testing pin No. 1 is shown, however, all 48 pins are tested simultaneously. Some of these 48 are input pins while others are output pins. Normally, it is desired to apply the random number pattern only to input pins. At other times it might be desired to continually apply either a "0" or a "1" to an input pin. At any rate, each of the output pins should be continually maintained at either a "0" or a "1" level so that a proper termination impedance is provided. This is accomplished by providing an appropriate up level to either the force "1" input to Invert circuit 73 or the force "0" input to Invert circuit 75. This is the switching capability previously attributed to buffer 70.

For purposes of example, let us assume that pin 1 is an input pin and it is desired to force neither a "0" or a "1." Therefore, the input to Invert circuit 73 will be maintained at a down level providing an up level at the Input of AND circuit 74. Assuming that a "0" data bit was inserted into PH72, its output will also be up. Since both inputs to AND circuit 74 are up, its inverted output presents a "0" to AND circuit 76. Similarly, the input to Invert circuit 75 is maintained at a down level providing an up level input to AND circuit 76. Since both inputs to AND circuit 76 are at an up level, the inverted output provides a down level, that is a "0," to both reference logic 30 and step generator 80. Note that this corresponds to the "0" placed in PH72 by RNG10. Step generator 80 then supplies this "0" to logic under test 20 as will now be described.

Figure 5:
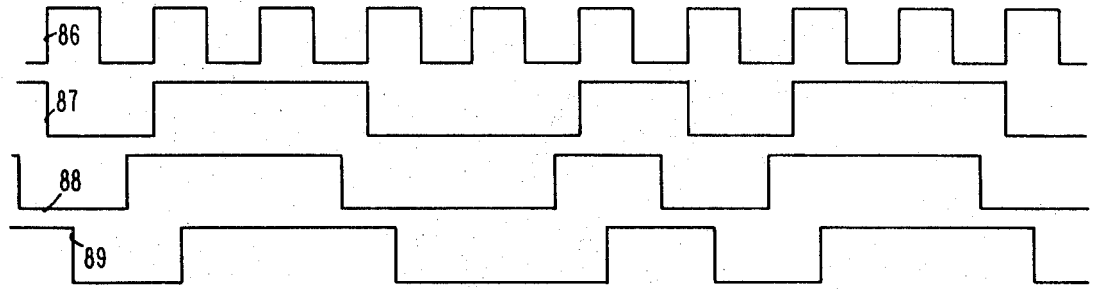
FIG. 5 is a waveform diagram showing the operation of the step generator.

Refer therefore to FIGS. 4 and 5. FIG. 4 shows a block diagram of step generator 80 and FIG. 5 is a timing chart of the various waveforms in the circuit. Step generator 80 is a circuit which will provide at its output digital information which is the same as pattern of digital information applied to its input line 88. However, this pattern will be synchronized to either the positive or negative transitions of the clock signal from delay circuit 54. The transitions at the generator output are independent of the transition time of the input data. The timing pulse input from delay circuit 54 is inserted into Invert circuit 81 and AnD circuit 84. The data signal from Invert circuit 77 of buffer 70 is inserted into delay circuit 82 and AND circuit 84. Therefore, an output at either AND circuit 83 or AND circuit 84 will produce an output at OR circuit 85. In this way an up level output will be present on line 87 when either an up level data signal on line 88 coincides with an up level clock pulse on line 86 or a delayed up level data signal on line 89 coincides with a down level clock pulse on line 86. The output pulse on line 87 derived in the manner just described supplies a desired test pulse to the pin under test through characteristic impedance $Z_0$. This pin under test is one of 48 such pins in logic under test 20.

For purpose of example, first assume that the pin under test is an output pin. If this is the case, either a "0" or a "1" would be forced in buffer 70 with a corresponding "0" or "1" applied on input line 88 to step generator 80. The output on line 87 would therefore always remain at either the "0" or "1" applied to input line 88. This in effect biases the pin under test to a desired up or down level in order to detect its response to the signals applied to the input pin.*

*If, on the other hand, the pin under test is an input pin, then neither a "0" or a "1" is forced. Therefore, the random signal stored in PH72 is applied by buffer 70 to input line 88 in step generator 80.

Figure 6:
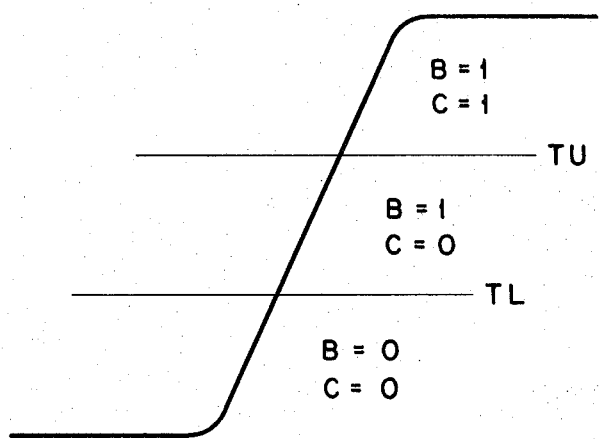
FIG. 6 is a waveform showing the operation of the dual discriminator.

The response of the pin under test is detected by dual discriminator 90. With continued reference to FIG. 4 its operation will be described. As shown, dual discriminator 90 comprises voltage detector 92 and voltage detector 94, each of them receiving an input from the pin under test. Each voltage detector also receives a reference voltage. Voltage detector 92 receives an up level reference voltage while voltage detector 94 receives a down level reference voltage. Voltage detector 92 will provide an up level output on output line C when the signal from the pin under test exceeds the up level reference voltage. Voltage detector 94 will have an output on output line B when the input from the pin under test is greater than the reference down level. FIG. 6 is a waveform showing the condition needed for outputs needed on line B and C. When the lower threshold TL is not exceeded both lines are at "0." When the lower threshold is exceeded there is an output on line B but line C remains at "0." When the upper threshold TU is exceeded both lines are brought to a "1" level. The signals on lines B and C are the input to AND circuit 44 and invert circuit 41 of unit compare logic 40.

With continued reference to FIG. 4, the operation of the unit compared logic will be described. A signal from reference logic 30 is received into Invert circuit 42 and AND circuit 43. This is the signal from the pin in reference logic 30 corresponding to the pin under test in logic under test 20. If either AND circuit 43 or AND circuit 44 have an output, an error condition exists. A signal from the pin under test which exceeds the lower threshold but does not exceed the upper threshold result in a "1" on line B and a "0" on line C. Therefore, both AND gates are conditioned so that an up level input from the reference logic will cause AND circuit 43 to have an output and a negative signal from reference logic 30 will cause AND circuit 44 to have an output. Therefore a voltage in the range will always provide an error signal.

If, however, a signal either exceeds the upper level or is less then the lower level, then an error occurs only if this signal from the pin under test does not match the signal from reference logic 30. Therefore, if the pin under test provides a "1" circuit 44 will be conditioned. But if reference logic 30 also provides a "1," the second input to AND circuit 44 will be a "0" and no error output results. If on the other hand the pin under test provides a "0," AND circuit 43 will be conditioned through Invert circuit 41. As long as the reference logic also supplies a "0" to AND circuit 43, no error output will be generated. Assuming that an error condition exists so that either AND circuit 43 or 44 has a "1" as an output, then the inverted output or circuit 45 will be a "0," and the output of Invert circuit 46 will be a "1." The second input to AnD gate 47 is merely a signal which is brought up when the tester is run in a mode to detect errors. This would normally be the case so that the second input to AND circuit 47 would normally be at an up level. Therefore, an up level output from Invert circuit 46 will cause AND circuit 47 to have an inverted output of "0," which is inserted into the pulse hold circuit 48 which provides an output in response to a timing signal from delay signal 56. This inverted output will be a "1" whenever an error has been detected. The outputs of all 48 pulse hold circuits 48 are applied to OR circuit 49 which provides a "O" output in response to a "1" input. This "O" or down level output is connected to gate 62 in strobe generator 60, blocking further clock pulses and stopping the test. Counter 66 indicates the number of tests performed prior to failure. Of course, as long as the system is running error free, or if failing pins are blocked at AND circuit 47, the output of OR circuit 49 is at "1" and gate 62 continues to pass clock pulses.

In conclusion, a test system for testing highly complex functional logic has been described. The system is statistical and operates by applying a random number test pattern to both the logic under test and a reference logic. The reference logic can be either a "good" unit of the type under test or it can be simulated. It is possible to test both input and output pins or just output pins. It is possible to test both combinatorial and sequential logic. The result is that microminiaturized circuitry with numerous inaccessible components is tested quickly and economically.

While the invention has been shown and particularly described with reference to preferred structures and methods, it will be understood by those skilled in the art that various changes in form and detail may be made therein without departing from the spirit and scope of the invention.

What is claimed is:

1. A system for testing a complex functional logic circuit having a plurality of connecting terminals said system comprising:
  a reference logic circuit having functional properties identical to that of the logic circuit under test;
  means for generating a random test pattern including:
    a first shift register for generating a pseudo-random signal pattern,
    a second shift register for generating a gating pattern, and
    gating means for gating the pseudo-random signals to a plurality of corresponding input terminals in both logic circuit under test and said reference logic; and
  a logic compare unit for receiving signals from the logic circuit under test and the reference logic circuit, and for providing an error output when any corresponding two of said signals differ.

2. An apparatus as in claim 1 further comprising:
  a step generator for shaping and timing the pseudo-random test pattern to the connecting pins of the logic under test, thereby applying signals of appropriate voltage levels to said connecting pins at appropriate timing intervals.

3. An apparatus as in claim 2 further comprising:
  analog means for detecting the voltage level of the signals from the connecting pins in the logic circuit under test.

4. An apparatus as in claim 3 wherein the logic compare unit comprises:
  means for detecting the output from the analog means; and
  means for supplying a signal for stopping the test cycle when an error has been detected.

5. A system for testing a complex functional logic circuit having a plurality of input and output terminals, said system comprising:
  a reference logic circuit having the same functional properties as the logic circuit under test;
  means for generating a random test pattern for application to each of the input terminals of the logic under test and the reference logic circuit;
  means for biasing the output terminals of the logic under test through an impedance to a desired termination level;
  analog means for converting the signals from the output terminals of the logic under test to two distinct digital signals; and
  comparing means for comparing the said two distinct digital signals with digital signals from corresponding output terminals of said reference logic circuit.

6. A system for testing a complex functional logic circuit having a plurality of inputs and outputs, said system comprising:
  a reference logic circuit having functional properties comparable to those of the logic circuit under test;
  means for generating a random test pattern for application to selected ones of the inputs to the logic circuit under test and the reference logic circuit;
  means for biasing the outputs of the logic circuit under test through an impedance to a desired termination level;
  analog means for converting the signals from the outputs of the logic circuit under test to two distinct digital signals; and
  comparing means for comparing the two distinct digital signals with digital signals from corresponding outputs of said reference logic circuit.

7. A system as in claim 6 wherein the reference logic circuit is a logic simulator having functional properties comparable to those of the logic circuit under test.

8. The method of sequentially testing a plurality of identical logic circuits each having a plurality of access terminals, comprising the steps of:
  generating a random test pattern;
  applying said generated random test pattern to a first one of said plurality of identical logic circuits under test for a fixed interval of time;
  determining the analog levels of the output terminals of the logic circuit under test;
  converting the analog levels to digital levels;
  comparing the digital levels of the response from the logic under test to the response from corresponding terminals of a reference logic circuit;
  applying said generated random test pattern to additional ones of said plurality of identical logic circuits under test for additional fixed intervals of time; and
  repeating the foregoing steps of determining, converting, and comparing with respect to said additional ones of said plurality of identical logic circuits;
  whereby after a large number of plurality of identical logic circuits have been thus tested, a condition where all possible combinations of said random test pattern being applied to said plurality of identical logic circuits is approached.

9. The method of sequentially testing a plurality of identical logic circuits each having a plurality of access terminals, comprising the steps of:
- simulating a reference logic circuit having the same functional properties as each of the plurality of identical logic circuits under test;
- generating a random test pattern;
- applying said generated random test pattern to a first one of said plurality of identical logic circuits under test for a fixed interval of time;
- determining the analog levels of the output terminals of the logic circuit under test;
- converting the analog levels to digital levels;
- comparing the digital levels of the response from the logic under test to the response from corresponding terminals of said simulated reference logic circuit;
- applying said generated random test pattern to additional ones of said of identical logic circuits under test for additional fixed intervals of time; and
- repeating the foregoing steps of determining, converting, and comparing with respect to said additional ones of said plurality of identical logic circuits;
- whereby after a large number of said plurality of identical logic circuits have been thus tested, a condition where all possible combinations of said random test pattern being applied to said plurality of identical logic circuits is approached.

FI 9-68-095

PO-1050
(5/69)

UNITED STATES PATENT OFFICE
CERTIFICATE OF CORRECTION

Patent No. 3,614,608    Dated October 19, 1971

Inventor(s) G. R. Giedd, G. A. Maley, and M. H. Perkins

It is certified that error appears in the above-identified patent and that said Letters Patent are hereby corrected as shown below:

| | |
|---|---|
| Column 1, line 39<br>Page 2, line 20 | delete "13" |
| Column 1, line 60<br>Page 3, line 19 | change "$2^n11$" to $--2^{n-1}--$ |
| Column 4, line 27<br>Page 11, line 7 | change "pin 01" to --pin #1-- |
| Column 6, line 31<br>Page 17, line 18 | change "AnD" to --AND-- |
| Column 7, line 19<br>Page 20, line 7 | after "1" insert --AND-- |
| Column 7, line 29<br>Page 20, line 19 | change "AnD" to --AND-- |
| Column 10, line 6 /<br>Claim 9<br>Spec. Amendment B /<br>Claim 15, line 18 | after "said" insert --plurality-- |

Signed and sealed this 22nd day of January 1974.

(SEAL)
Attest:

EDWARD M. FLETCHER, JR.          RENE D. TEGTMEYER
Attesting Officer                Acting Commissioner of Patents